C. W. DOLLSCHECK.
RIM STRETCHER.
APPLICATION FILED OCT. 31, 1917.
1,298,677.
Patented Apr. 1, 1919.
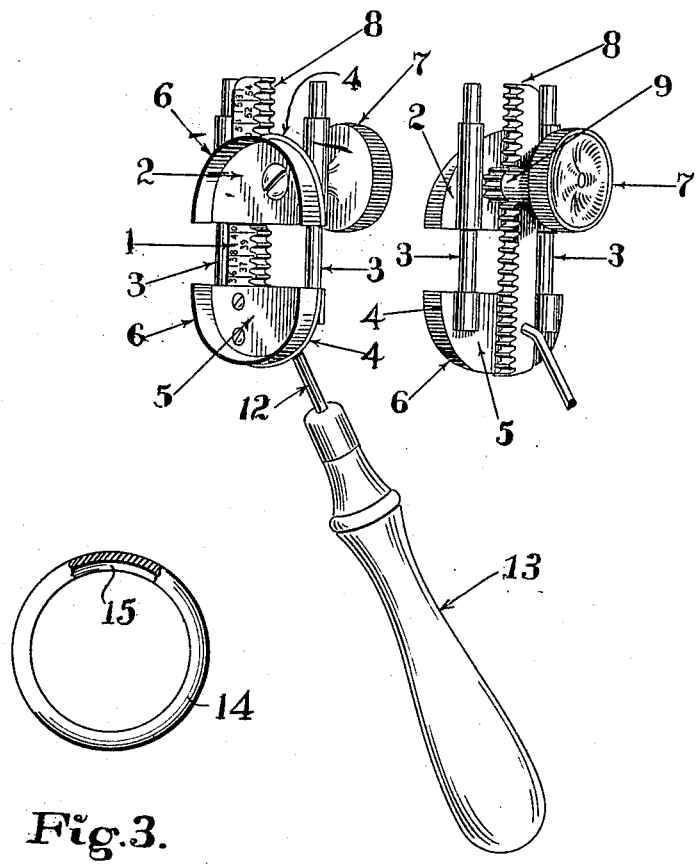
INVENTOR
Charles W. Dollscheck

UNITED STATES PATENT OFFICE.

CHARLES W. DOLLSCHECK, OF PHILADELPHIA, PENNSYLVANIA, ASSIGNOR OF ONE-HALF TO MARCUS ROTHSCHILD, OF PHILADELPHIA, PENNSYLVANIA.

RIM-STRETCHER.

1,298,677. Specification of Letters Patent. Patented Apr. 1, 1919.

Application filed October 31, 1917. Serial No. 199,421.

*To all whom it may concern:*

Be it known that I, CHARLES W. DOLLSCHECK, a citizen of the United States, and a resident of Philadelphia, in the county of Philadelphia and State of Pennsylvania, have invented certain new and useful Improvements in Rim-Stretchers, of which the following is a specification.

This invention relates to improvements in rim stretchers, and particularly such as are adapted to stretch flexible spectacle rims to the size of the lenses the rims are to carry.

The chief object of this invention is to produce a device adapted to stretch the rim of a lens without twisting or turning, and a further object is to provide a rim stretcher with a gage adapted to indicate the distance through which the rim is stretched.

With the above and related objects in view, my invention comprises the construction, combination and the arrangement of parts hereinafter described, an embodiment whereof is illustrated in the accompanying drawing, and is embraced within the scope of the appended claims.

In the said drawing, Figure 1 represents a perspective front view of my improved stretcher; Fig. 2 represents a perspective rear view thereof, and Fig. 3 represents a rim adapted to be stretched.

Referring more particularly to the drawing for a detail description of my invention:—1 represents a bar provided with an indicating scale as shown, 2 represents a semicircular disk provided slidingly mounted on a pair of rods 3, adapted to guide the disk 2 in front and longitudinally of the scale of the bar 1. The rods 3 are carried by a semicircular disk 5 which is the counterpart of the disk 2. 6, 6 are flanges mounted on the front faces of the disks. The diameter of the flanges 6 is less than that of the disks, thus providing rims 4 outwardly of the flanges.

7 represents a thumb wheel which is journaled in the disk 2 and is projected rearwardly thereof. The bar 1 is provided with a rack 8 in mesh with a gear 9 carried by the wheel 7. The bar 1 is carried by the disk 5 which is also provided with a rod 12 for a handle 13.

Having thus described my improved stretcher, it will be understood that, by turning the wheel 7 in a given direction, the flanges 6 may be brought together so as to form a closed ring. The rim 14, shown in Fig. 3, is assumed to be of an inner diameter adapted to carry a lens of a minimum size. To adapt the rim 14 for a lens of a larger size, the rim is mounted upon the ring of the stretcher formed by the closed flanges 6 and is held against the rim 4. The wheel 7 is then turned in an opposite direction, causing the flanges 6 to move apart, and stretching the rim 14, the scale of the bar 1 indicating the amount of stretch.

It will be observed that the rim 14 is provided with a groove 15 for the rim of a lens, and in stretching the ring it is important not to change the relative position of said groove. The displacement of the groove 15 is prevented by the flanges 6, which are constrained to move in a straight line.

Having thus described my invention, what I claim as new and desire to protect by Letters Patent, is—

1. A rim stretcher comprising a wheel-like form having a circular flange at one side, divided diametrally into two sections, guides slidably connecting the sections and turning means for separating the sections.

2. A rim stretcher comprising two semi-circular sections, guides attached to one of said sections and whereon the other section is slidable, a rack and pinion carried by said sections whereby they may be moved relatively to each other on said guides, and a scale attached to one section and extending in line of movement of the other section.

3. A rim stretcher of substantially wheel form with circular tread and flange divided diametrally into two sections, guides attached to one section and whereon the other section is slidable, and means to separate the sections.

4. A rim stretcher comprising a rod member and a slide therefor, a cylindrical rim in two parts, one part of the rim being carried by the rod member and the other part by the slide and means for moving the slide on the rod member.

CHARLES W. DOLLSCHECK.

Copies of this patent may be obtained for five cents each, by addressing the "Commissioner of Patents, Washington, D. C."